US008837764B2

United States Patent
Chou

(10) Patent No.: US 8,837,764 B2
(45) Date of Patent: Sep. 16, 2014

(54) PORTABLE LOUDSPEAKER

(75) Inventor: Ching-Ling Chou, New Taipei (TW)

(73) Assignee: Topower Computer Industrial Co., Ltd., New Taipei (TW)

( * ) Notice: Subject to any disclaimer, the term of this patent is extended or adjusted under 35 U.S.C. 154(b) by 275 days.

(21) Appl. No.: 13/529,645

(22) Filed: Jun. 21, 2012

(65) Prior Publication Data

US 2013/0343579 A1    Dec. 26, 2013

(51) Int. Cl.
*H04R 25/00* (2006.01)
*H04M 1/03* (2006.01)
*H04R 1/28* (2006.01)
*H04R 1/10* (2006.01)

(52) U.S. Cl.
CPC .............. *H04M 1/03* (2013.01); *H04R 1/2815* (2013.01); *H04R 2499/11* (2013.01); *H04R 1/1008* (2013.01)
USPC ....... 381/349; 381/334; 381/386; 379/433.02

(58) Field of Classification Search
CPC ........ H04R 1/20; H04R 1/225; H04R 1/1008; H04R 1/2811; H04R 1/2815; H04R 1/2819; H04R 1/2842; H04R 2499/11; H03M 1/03
USPC ......... 381/334, 345, 349, 351, 160, 162, 370, 381/371, 372, 386, 387; 379/420.02, 379/428.01, 430, 433.02, 432
See application file for complete search history.

(56) References Cited

U.S. PATENT DOCUMENTS

| 4,239,945 A * | 12/1980 | Atoji et al. ..................... 381/371 |
| 6,785,395 B1 * | 8/2004 | Arneson et al. ................ 381/334 |
| 6,788,798 B1 * | 9/2004 | Backman ....................... 381/372 |

FOREIGN PATENT DOCUMENTS

| TW | 467461 U | 12/2001 |
| TW | M343997 U | 11/2008 |

* cited by examiner

*Primary Examiner* — Huyen D Le
(74) *Attorney, Agent, or Firm* — Muncy, Geissler, Olds & Lowe, P.C.

(57) ABSTRACT

A portable loudspeaker includes a base and a speaker cap opposing the base. The base and speaker cap are interposed by a movable resonance portion. The movable resonance portion is formed in a storing state and a releasing state. The base has a resonance reflection portion to receive reverse resonance sound waves generated by a speaker. The movable resonance portion includes a first transmission channel to transmit the reverse resonance sound waves to the resonance reflection portion and a second transmission channel to transmit base sound waves generated by the resonance reflection portion from the reverse resonance sound waves towards the speaker cap. The speaker cap has a second audio outlet to output the bass sound waves.

7 Claims, 5 Drawing Sheets

PORTABLE LOUDSPEAKER

FIELD OF THE INVENTION

The present invention relates to a portable loudspeaker and particularly to a portable loudspeaker with improved bass through reverse resonance sound waves.

BACKGROUND OF THE INVENTION

Loudspeaker broadcasts music by generating vibration through a diaphragm at corresponding amplitudes according to audio signals. It allows people to enjoy music anytime anywhere. Advance of technology enables the loudspeaker to be made in a compact size and portable to facilitate carrying outdoors so that people can enjoy music outside the houses or during recreation. However, the conventional portable loudspeakers mostly focus on microminiaturization that compromises acoustic quality.

The diaphragm is vibrated to generate sound waves. Forward resonance sound waves are generated when the diaphragm is vibrated forwards, and reverse resonance sound waves are generated when the diaphragm is vibrated rearwards. Most conventional portable loudspeakers at present have only one audio outlet for output of the forward resonance sound waves. They usually do not have sound channel structure, hence a great portion of the forward resonance sound waves are muffled in the portable loudspeaker. This causes loss of bass broadcasting. Hence the portable loudspeaker often provides only treble output but does not generate bass resonance, and results in inferior sound quality. For instance, R.O.C. utility model No. M343997 discloses a speaker in which the reverse resonance sound waves are generated and muffled in the resonance cabinet so that sound cannot be output effectively to result in poor sound quality. Another R.O.C. utility model No. 467461 discloses a mini sound cabinet equipped with a sound channel structure. It has a sound channel tube and a sound channel trough to transmit and broadcast bass. But its sound channel structure is fixed and cannot be changed. It also is quite bulky and difficult to carry or be packaged for transportation. To provide structural improvement for the portable loudspeaker to output the bass effectively can help to improve the acoustic quality of the portable loudspeaker.

SUMMARY OF THE INVENTION

The primary object of the present invention is to provide an improved portable loudspeaker to solve the problem of the conventional loudspeaker that cannot broadcast the bass as desired to result in inferior sound quality.

To achieve the foregoing object, the present invention provides a portable loudspeaker which includes a base and a speaker cap opposing the base. The base and speaker cap are bridged by a movable resonance portion. The movable resonance portion is formed in a storing state in which the base and speaker cap are coupled together, and a releasing state in which the base and speaker cap are separated. The base and speaker cap have respectively an audio conversion module and a speaker that are electrically connected to each other. The speaker cap also has a first audio outlet to allow the speaker to output audio signals. The base has a resonance reflection portion to receive reverse resonance sound waves generated by the speaker relative to the first audio outlet. The movable resonance portion includes a first transmission channel to transmit the reverse resonance sound waves to the resonance reflection portion and a second transmission channel to transmit base sound waves generated by the resonance reflection portion from the reverse resonance sound waves towards the speaker cap. The speaker cap has a second audio outlet to output the bass sound waves.

In one embodiment the movable resonance portion includes a first lift member formed in the first transmission channel and a second lift member coupled on an outer side of the first lift member to form the second transmission channel therewith. The base has a housing compartment to hold the first lift member and second lift member.

In another embodiment the movable resonance portion includes an elastic thrust member to aid the base and speaker cap in switching states between them.

In yet another embodiment the base has a first retaining portion, and the speaker cap has a second retaining portion fastenable to the first retaining portion. When the first and second retaining portions are fastened together the movable resonance portion is compressed in the storing state.

In yet another embodiment the resonance reflection portion is a vibration diaphragm or vibration board located in the base.

In short, the invention mainly provides a movable resonance portion capable of forming in a storing state and a releasing state. In the releasing state, a first transmission channel and a second transmission channel are formed. Through the first transmission channel, the reverse resonance sound waves generated by the speaker are transmitted and directed to the resonance reflection portion of the base. The second transmission channel further transmits the base sound waves generated by the resonance reflection portion from the reverse resonance sound waves to the second audio outlet for output. The portable loudspeaker thus formed has a sound channel structure to facilitate bass broadcasting and also output the reverse resonance sound waves, thereby better sound effect with improved quality can be provided.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENTS

Figure 1:
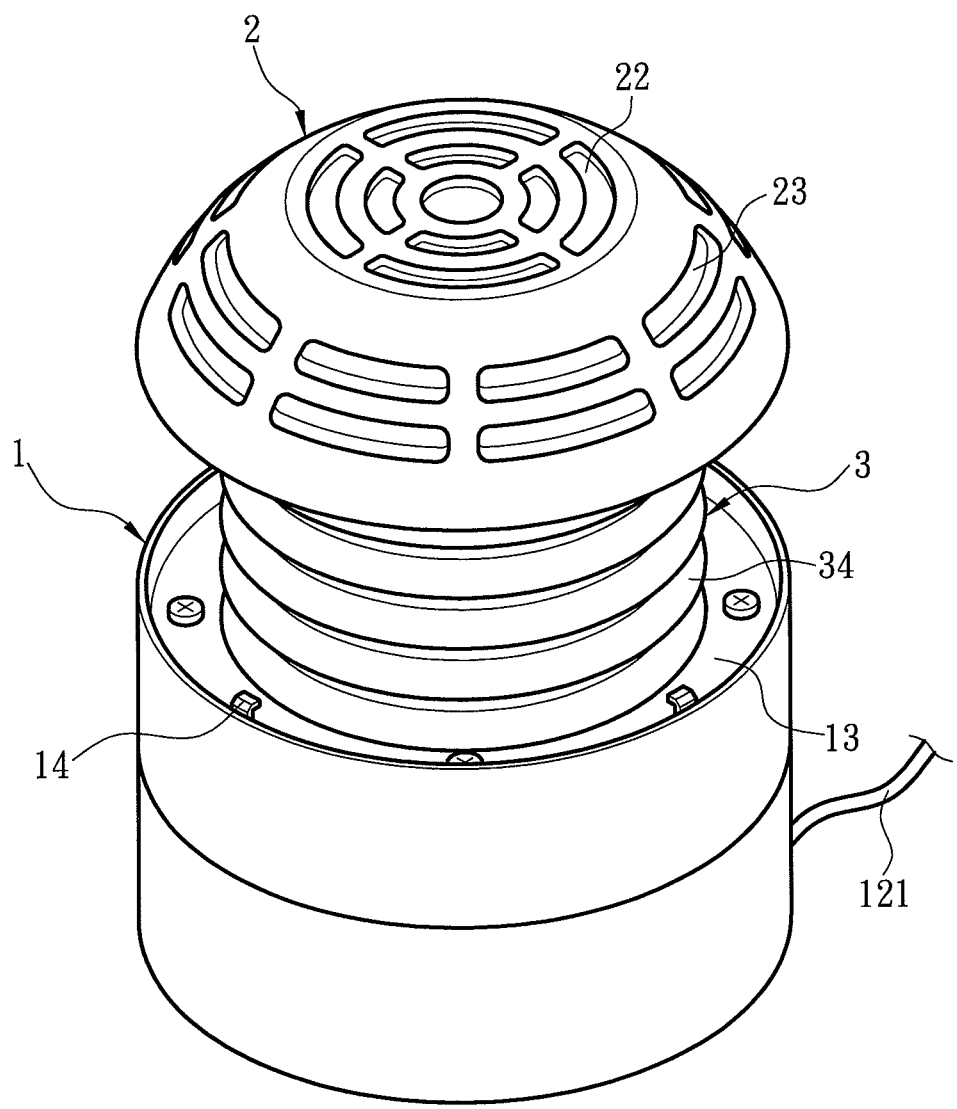
FIG. 1 is a perspective view of an embodiment of the invention in a releasing state.
Figure 2:
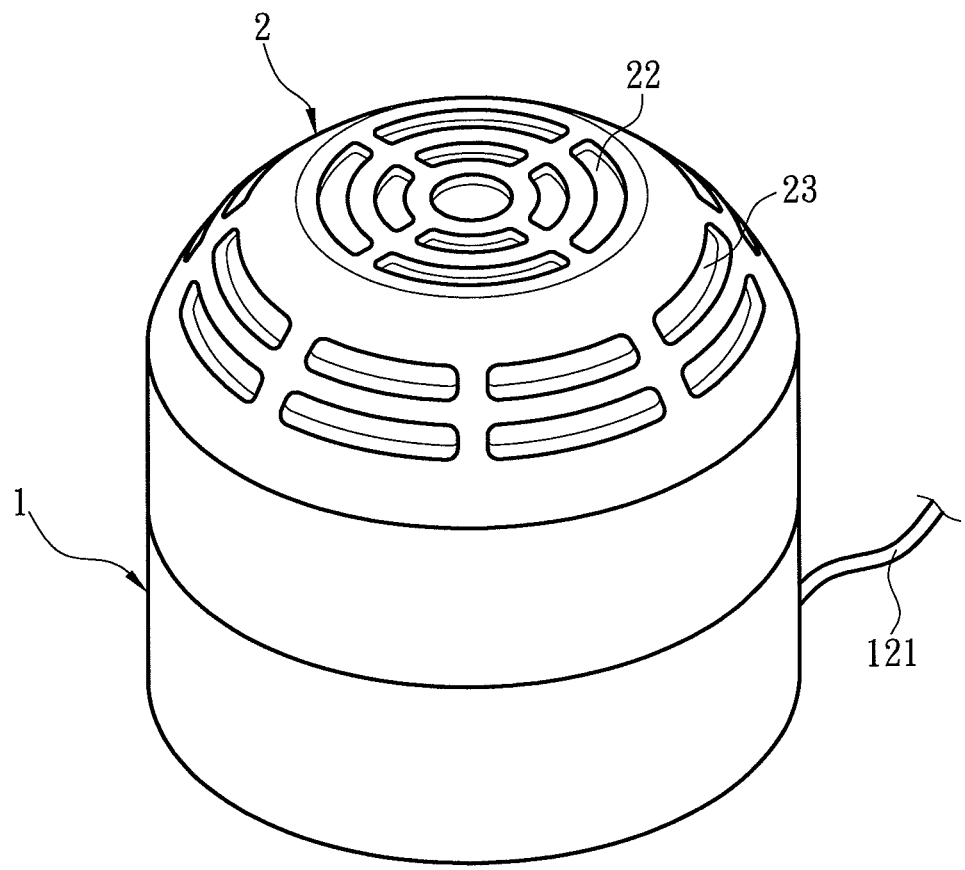
FIG. 2 is a perspective view of an embodiment of the invention in a storing state.
Figure 3:
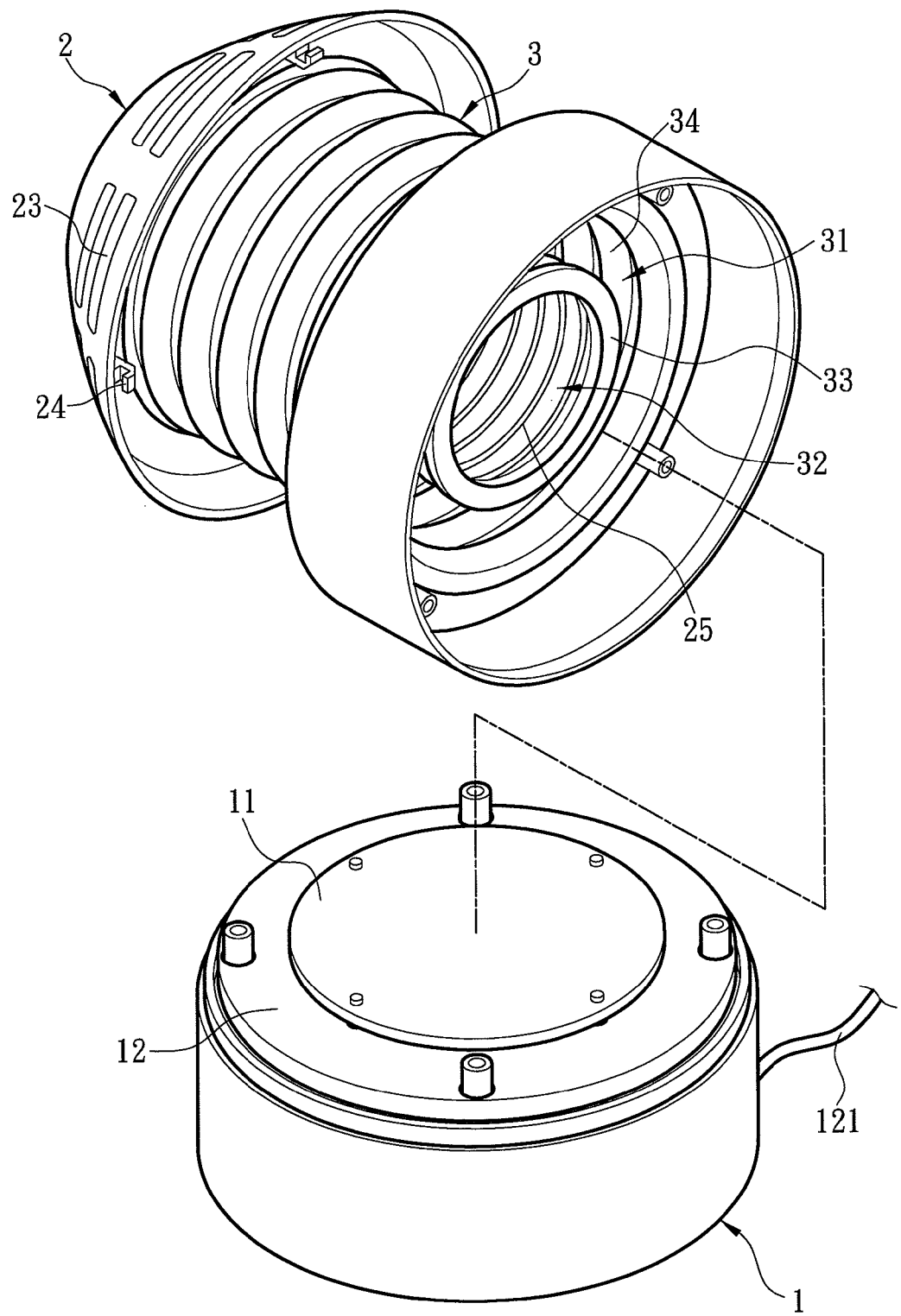
FIG. 3 is an exploded view of an embodiment of the invention in the releasing state.
Figure 4:
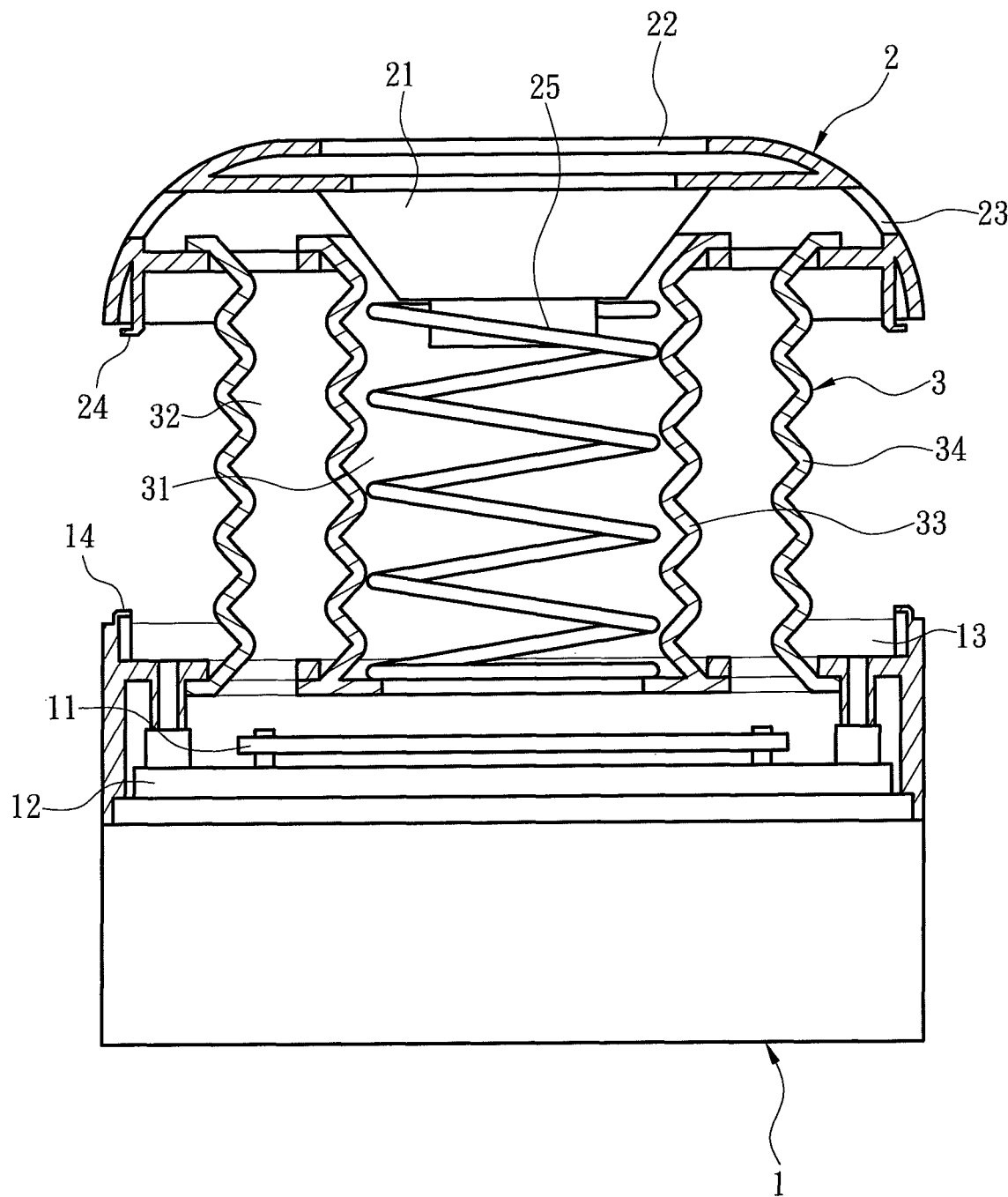
FIG. 4 is a sectional view of an embodiment of the invention in the releasing state.

Please refer to FIGS. 1 and 2 for an embodiment of the portable loudspeaker of the invention. It comprises a base 1, a speaker cap 2 and a movable resonance portion 3 bridging the base 1 and speaker cap 2. The movable resonance portion 3 is formed in a storing state in which the base 1 and speaker cap 2 are coupled together as shown in FIG. 2 and a releasing state in which the speaker cap 2 and the base 1 are separated as shown in FIG. 1. The base 1 includes a resonance reflection portion 11 and an audio conversion module 12 to process audio signals. The speaker cap 2 opposes the base 1 and includes a speaker 21 electrically connected to the audio conversion module 12, a first audio outlet 22 and a second audio outlet 23 surrounding the first audio outlet 22. When the movable resonance portion 3 is in the releasing state, it has a first transmission channel 31 to receive reverse resonance sound waves generated by the speaker 21 and transmit the reverse resonance sound waves to the resonance reflection portion 11, and a second transmission channel 32 communicating with the first transmission channel 31 to direct bass sound waves generated by the resonance reflection portion 11 from the reverse resonance sound waves to the speaker cap 2 for output through the second audio outlet 23. Referring to FIG. 3 for an example in which the first and second transmission channels 31 and 32 are parallel with each other, but this is not the limitation of the invention. The base 1 may further include an electric power storage unit or an electric connector 121 electrically connected to an external electronic device, thereby the invention can get audio signals for broadcasting from the external electronic device, or get electric power required in operation from the external electronic device.

Figure 5:
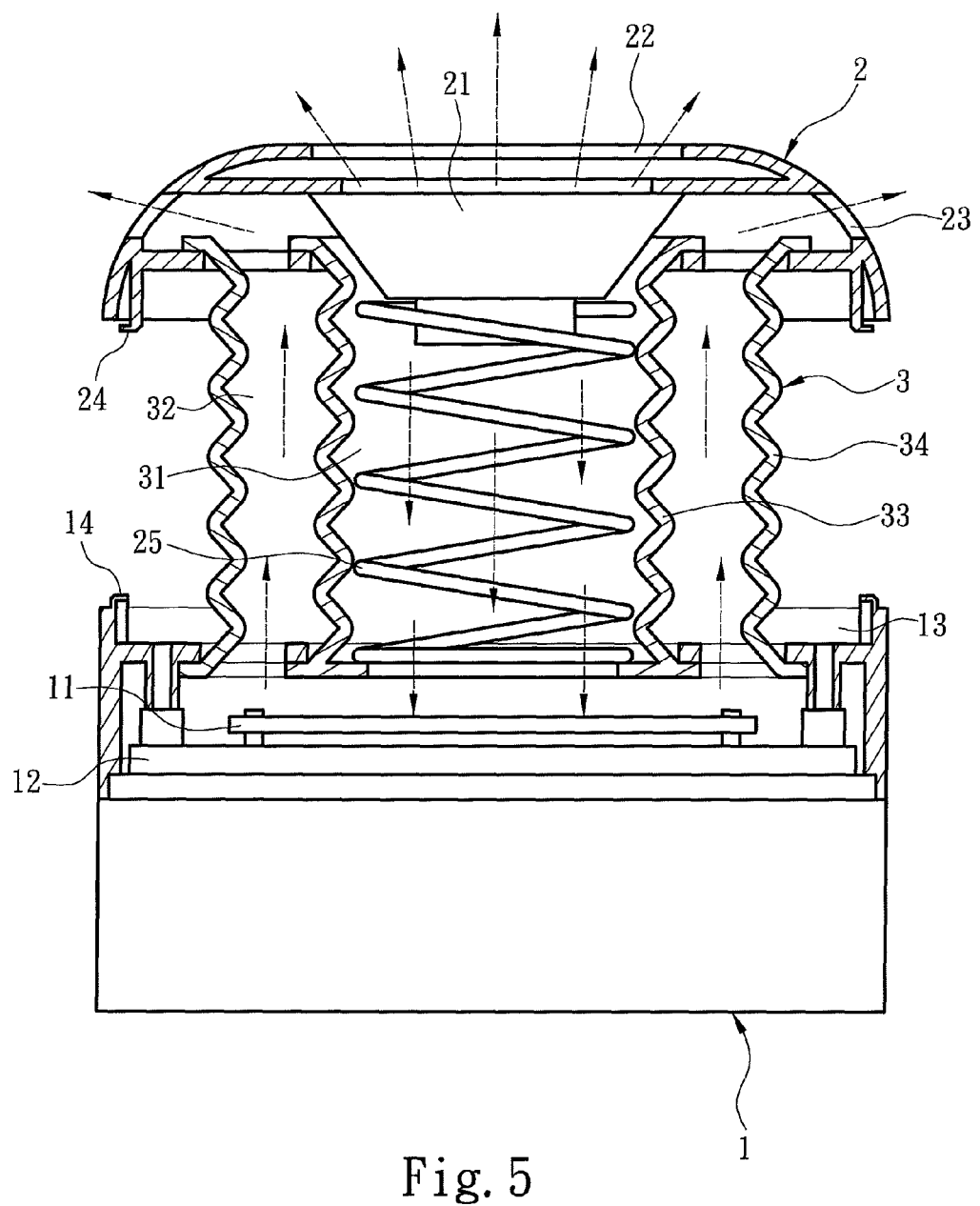
FIG. 5 is a schematic view of an embodiment of the invention in the releasing state showing sound waves transmission directions.

In this embodiment, after the speaker 21 is electrically connected to the audio conversion module 12, it receives the audio signals processed and generated by the audio conversion module 12, and then broadcasts the sound to generate forward resonance sound waves and reverse resonance sound waves. Implementation of the movable resonance portion 3 can be changed according to use requirements. When the movable resonance portion 3 is in the storing state, it is compressed and retracted, and the base 1 and speaker cap 2 are coupled together without forming the first transmission channel 31 and second transmission channel 32 in the movable resonance portion 3. When the speaker 21 is driven, the forward resonance sound waves generated by the speaker 21 are output via the first audio outlet 22, while the reverse resonance sound waves cannot be transmitted due to the lack of the first transmission channel 31 and second transmission channel 32 mentioned above. Please also refer to FIG. 5, when the speaker cap 2 is drawn by force, the movable resonance portion 3 is driven to stretch so that the base 1 and speaker cap 2 are separated and the first transmission channel 31 and second transmission channel 32 are formed inside the movable resonance portion 3. Thus, when the speaker 21 is driven, the forward resonance sound waves are output via the first audio outlet 22, but the reverse resonance waves are transmitted in the first transmission channel 31 to reach to the resonance reflection portion 11. Then the reverse resonance waves immediately generate bass sound waves directed to the second transmission channel 32 via the resonance reflection portion 11, and are output via the second audio outlet 23. Thus, when the movable resonance portion 3 is in the releasing state, the reverse resonance sound waves generated by the speaker 21 go through the aforesaid processes and output via the second audio outlet 23, and the bass sound waves formed from the reverse resonance sound waves can resonate with the forward resonance sound waves output through the first audio outlet 22, hence improved sound quality can be attained.

In this embodiment the movable resonance portion 3 also includes a first lift member 33 and a second lift member 34 to bridge the base 1 and speaker 3. The second lift member 34 is coupled outside the first lift member 33. When the movable resonance portion 3 is in the releasing state, the first transmission channel 31 is formed inside the first lift member 33, and the second transmission channel 32 is formed between the first and second lift members 33 and 34. The base 1 further has a housing compartment 13 to hold the first and second lift members 33 and 34. When the movable resonance portion 3 is in the storing state, the first and second lift members 33 and 34 are held in the housing compartment 13. The first and second lift members 33 and 34 are parallel with each other. In addition, the first lift member 33 can further include an elastic thrust member 25 inside to provide a thrust force to rapidly lift the movable resonance portion 3 into the releasing state. In this embodiment the elastic thrust member 25 is held in the first transmission channel 31 as an example, however, it also can be held in the second transmission channel 32.

In another embodiment the base 1 has a first retaining portion 14, and the speaker cap 2 has a second retaining portion 24 fastenable to the first retaining member 14. When the movable resonance portion 3 is compressed under a force, the first retaining portion 14 is connected to the second retaining portion 24 to make the movable resonance portion 3 in the storing state in normal conditions. The state of the movable resonance portion 3 can be changed by separating the first retaining portion 14 and second retaining portion 24, and then the speaker cap 2 can be moved by an external force to drive and lift the movable resonance portion 3 into the releasing state. The aforesaid first retaining portion 14 and second retaining portion 24 can be formed in a staggered manner so that when the movable resonance portion 3 is compressed the speaker cap 2 is coupled on the base 1, and the speaker cap 2 can be swiveled to engage the staggered first and second retaining portions 14 and 24 together.

In yet another embodiment, the resonance reflection portion 11 in the base 1 can be a vibration diaphragm or a vibration board to enhance resonance reflection effect with improved quality.

As a conclusion, the portable loudspeaker of the invention mainly includes a movable resonance portion switchable between a releasing state and a storing state. In the releasing state, a first transmission channel and a second transmission channel are formed, and reverse resonance waves generated by the speaker transmit via the first transmission channel and direct to the resonance reflection portion on the base. The reverse resonance waves generate bass sound waves due to the resonance reflection portion, and the bass sound waves are further directed from the resonance reflection portion to the second transmission channel and output via the second audio outlet.

As a result, the portable loudspeaker thus formed can transmit the reverse resonance sound waves and convert them into the bass sound waves for output, thereby better sound effect with improved quality can be provided.

While the preferred embodiments of the invention have been set forth for the purpose of disclosure, they are not the limitations of the invention, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A portable loudspeaker, comprising:
a base, a speaker cap opposing the base, and a movable resonance portion located between the base and the speaker cap; the movable resonance portion being formed in a storing state in which the base and the speaker cap are coupled together and a releasing state in which the speaker cap and the base are separated, the base and the speaker cap including respectively an audio conversion module and a speaker electrically connected to each other, the speaker cap including a first audio outlet to output audio signals of the speaker; wherein:
the base includes a resonance reflection portion to receive reverse resonance sound waves generated by the speaker relative to the first audio outlet, the movable resonance portion including a first transmission channel to transmit the reverse resonance sound waves to the resonance reflection portion and a second transmission channel to transmit bass sound waves generated by the resonance reflection portion from the reverse resonance sound waves towards the speaker cap for output, the speaker cap also including a second audio outlet to output the bass sound waves.

2. The portable loudspeaker of claim 1, wherein the movable resonance portion includes a first lift member to form the first transmission channel and a second lift member coupled on an outer side of the first lift member to form the second transmission channel with the first lift member.

3. The portable loudspeaker of claim 2, wherein the base includes a housing compartment to hold the first lift member and the second lift member.

4. The portable loudspeaker of claim 2, wherein the movable resonance portion includes an elastic thrust member to aid the base and the speaker cap in switching between the releasing state and the storing state.

5. The portable loudspeaker of claim 1, wherein the base includes a first retaining portion and the speaker cap includes a second retaining portion fastenable to the first retaining portion.

6. The portable loudspeaker of claim 1, wherein the resonance reflection portion is a vibration diaphragm located in the base.

7. The portable loudspeaker of claim 1, wherein the resonance reflection portion is a vibration board located in the base.

* * * * *